United States Patent [19]

Hicks

[11] Patent Number: 4,778,238
[45] Date of Patent: Oct. 18, 1988

[54] OPTICAL COMMUNICATIONS SYSTEMS AND PROCESS FOR SIGNAL AMPLIFICATION USING STIMULATED BRILLOUIN SCATTERING (SBS) AND LASER UTILIZED IN THE SYSTEM

[76] Inventor: John W. Hicks, 312 Howard St., Northboro, Mass. 01532

[21] Appl. No.: 761,366

[22] Filed: Aug. 1, 1985

[51] Int. Cl.$^4$ .................... G02B 6/28; H04B 9/00; G02F 1/00; H01S 3/30
[52] U.S. Cl. .................... 350/96.16; 350/96.15; 350/96.29; 350/320; 370/1; 370/3; 455/600; 455/609; 455/610; 455/612; 455/617; 372/6; 372/20; 372/70; 372/97
[58] Field of Search ............ 350/96.10, 96.15, 96.16, 350/96.20, 96.21, 96.29, 96.30, 320; 372/3, 6, 13–20, 23, 25, 28, 32, 69, 70, 71, 72, 92, 95, 97, 98, 105, 106; 455/600, 601, 602, 605, 606, 607, 608, 609, 612, 616, 617, 620; 356/349, 350, 351; 370/1, 2, 3, 4; 250/227

[56] References Cited

U.S. PATENT DOCUMENTS

| | | | |
|---|---|---|---|
| 3,622,911 | 11/1971 | Marcatilli | 372/97 X |
| 3,659,916 | 5/1972 | Marcatilli | 350/96.12 |
| 3,760,297 | 9/1973 | Thompson | 350/96.15 X |
| 4,025,172 | 5/1977 | Freiberg | 372/97 X |
| 4,107,628 | 8/1978 | Hill et al. | 372/6 X |
| 4,159,178 | 6/1979 | Vali et al. | 356/350 |
| 4,315,666 | 2/1982 | Hicks, Jr. | 350/96.15 |
| 4,321,550 | 3/1982 | Evtuhov | 372/9 X |
| 4,429,393 | 1/1984 | Giuliano | 372/20 X |
| 4,515,431 | 5/1985 | Shaw et al. | 350/96.15 |
| 4,530,097 | 7/1985 | Stokes et al. | 372/6 |
| 4,546,476 | 10/1985 | Shaw et al. | 372/6 |
| 4,553,238 | 11/1985 | Shaw et al. | 372/6 |
| 4,592,043 | 5/1986 | Williams | 370/3 |
| 4,616,898 | 10/1986 | Hicks, Jr. | 350/96.15 |
| 4,622,671 | 11/1986 | Tsang | 372/19 |
| 4,676,583 | 6/1987 | Hicks, Jr. | 350/96.15 |
| 4,699,452 | 10/1987 | Mollenauer et al. | 350/96.16 |

FOREIGN PATENT DOCUMENTS

| | | | |
|---|---|---|---|
| 59-89480 | 5/1984 | Japan | 372/6 |
| 02168 | 6/1983 | PCT Int'l Appl. | 350/96.15 |
| WO86/06885 | 11/1986 | PCT Int'l Appl. | 372/6 |
| WO87/00935 | 2/1987 | PCT Int'l Appl. | 350/96.16 |

OTHER PUBLICATIONS

Thomas et al., "Possibility of using an optical fiber brillouin ring laser . . . " Applied Optics vol. 19, No. 12 6/80 pp. 1906–1908.
Kawasaki et al., "Bandwidth-limited operation of a mode-locked . . . " Appl. Phys. Lett. vol. 32, No. 7 4/78 pp. 429–431.
Hill et al., "CW generation of Multiple Stokes . . . " Applied Phys Lett. vol. 29, No. 3 8/76 pp. 185–187.
Culver, "Generating Synchronized Pairs of Q-Switched Laser Pulses" IBM tech discl. bull. vol. 15, No. 1 6/72 pp. 323–324.

*Primary Examiner*—William L. Sikes
*Assistant Examiner*—Brian M. Healy
*Attorney, Agent, or Firm*—Andrew F. Kehoe

[57] ABSTRACT

Communications Systems particularly suited for manipulating stimulated Brillouin scattering (SBS), or similar tunable laser amplification effects, to acheive improved means for selecting an optical signal from many such signals carried on a single fiber. This disclosure also describes means for producing a tunable, spectrally-narrow line to power this laser amplification. The disclosure also describes an improved polarization-sweeping device which allows the system to handle variable polarization of signals, when necessary. It also discloses other subsystems and apparatus facilitating the optimum signal-tapping process, including heterodyning procedures, a low-band-width channel-indentification means, and a new laser, all particularly useful in the system described. The laser is also useful in other systems where a tunable, spectrally narrow, stable source is required.

79 Claims, 15 Drawing Sheets

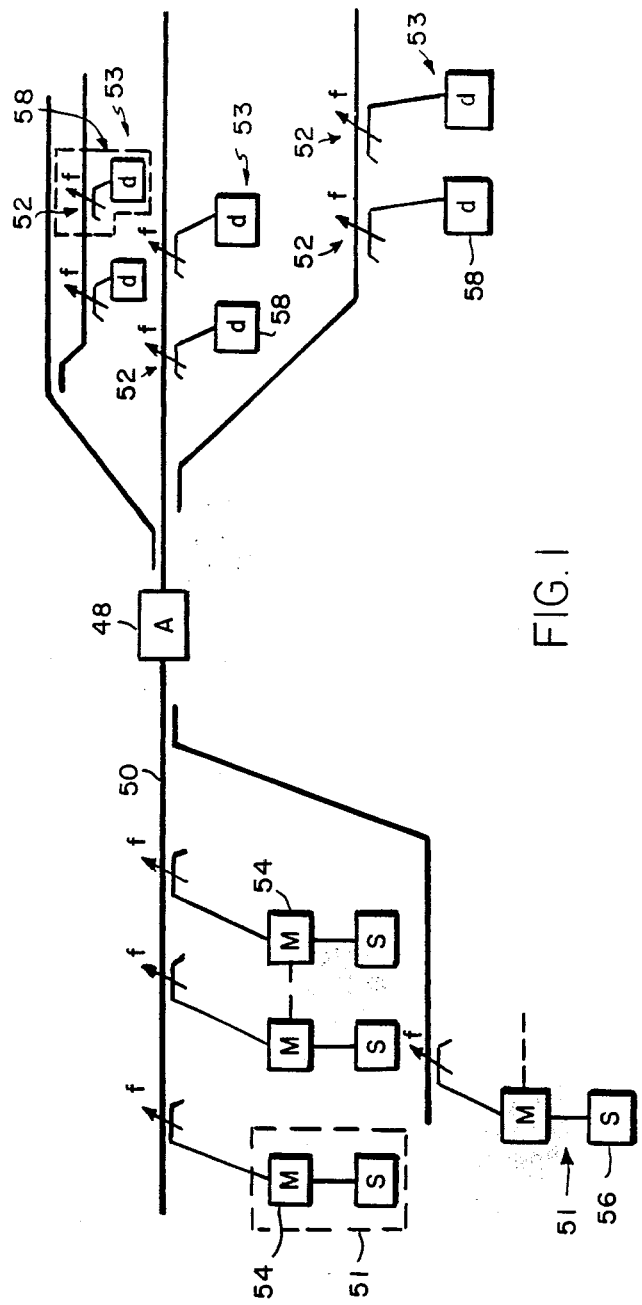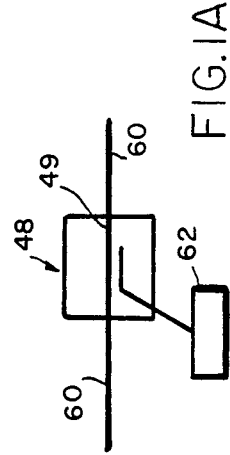
FIG. 1
FIG. 1A

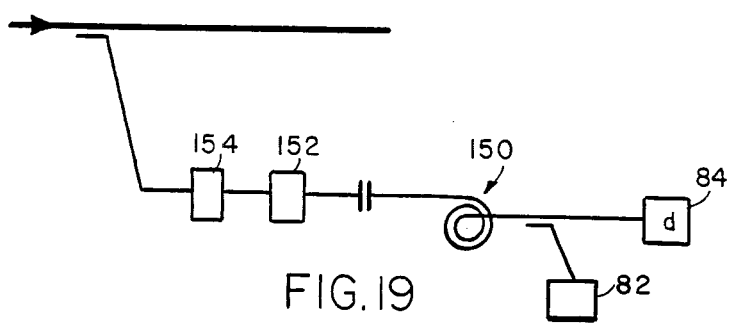
FIG. 19
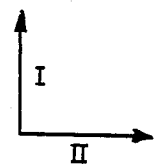
PRINCPAL AXIS
FIG.19A
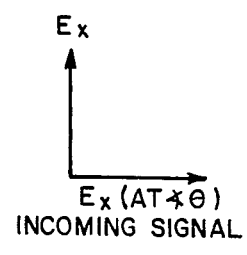
INCOMING SIGNAL
FIG.19B
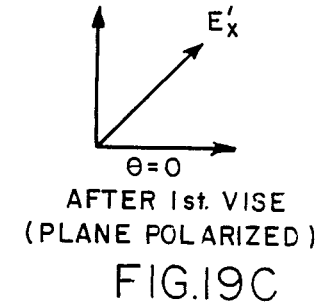
AFTER 1st. VISE
(PLANE POLARIZED)
FIG.19C
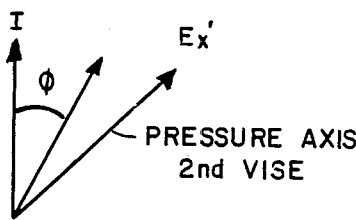
PRESSURE AXIS
2nd VISE
FIG.19D
INCOMING SIGNAL
AFTER 2nd VISE
READY TO ENTER
POLARIZATION-MAINTAINING
AMPLIFIER FIBER
FIG.19E
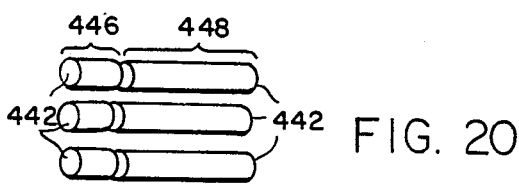
FIG. 20
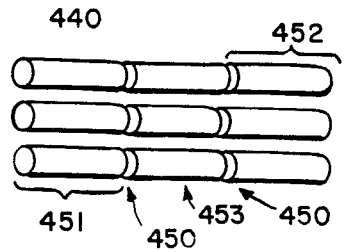
FIG. 21

OPTICAL COMMUNICATIONS SYSTEMS AND PROCESS FOR SIGNAL AMPLIFICATION USING STIMULATED BRILLOUIN SCATTERING (SBS) AND LASER UTILIZED IN THE SYSTEM

BACKGROUND OF THE INVENTION

This invention relates to a new system for processing communications signals using optical-frequency multiplexing in communicating through optical fibers and, also, to various novel processes and novel apparatus used in the system. More particularly the system utilizes stimulated scattering energy as a means to improve tunability, power levels, and channel discrimination of such systems.

The advantages of utilizing optical fibers in communications systems have long been recognized. More recent experience with such fibers has confirmed their value and encouraged their use in data-transmission systems of increasing complexity and information-bearing capability.

Thus, optical-frequency multiplexing of signals has been recognized as a promising way to allow high rates of data transmission through an optical fiber, and, also, as a way to provide a means from which individual dual channels of information can be selectively extracted by appropriate means along the fiber. Such systems practically, but not necessarily, utilize single-polarization or polarization-maintaining fiber.

It has been a continuing problem to meet the potential of fiber-optic systems by providing means to allow more signals to be multiplexed in a single fiber and, particularly, to provide means for selectively and economically tapping into and out of such multiplexed systems for sending and receiving selected channels of the information being transmitted therein. The present inventor has described various problems and solutions relating to these very general problems in U.S. Pat. Nos. 4,315,666 and 4,342,499 and in an International Application published under the Patent Cooperation Treaty (PCT) No. WO83/02168. U.S. Pat. No. 4,315,666 relates to coupling of fibers to transmit signals therebetween by varying the shape and placement of coupled cores in fiber constructions; U.S. Pat. No. 4,342,499 relates to means for transferring any of a number of wavelengths from one fiber to an adjacent fiber by such physical means as, for example, bending or tapering coupled fiber cores to change the wavelength at which tuning occurs. The PCT publication discloses means to separate specific wavelengths from a broader spectrum of wavelengths through use of a novel fiber optics device which is mechanically distinct from the optical fiber carrying the broader spectrum of signals. This novel device, called a resonant-cavity signal tap, was developed in response to the need to be able to selectively receive and interpret individual signal channels without disturbing the much larger number of signal bearing channels which optical-communications designers wish to use in communications systems.

A problem relating to such resonant cavity taps, as described in the PCT application, is inherent in the fact that there are rather long tails on the transfer curves of such devices. Some alleviation of this problem is achieved by using a number of such taps in series; but, the maintenance of channel (frequency) spectral width when more than one tap is used in series requires that the transfer curve of each tap be made somewhat wider; so, the aforesaid tail on a transfer curve becomes even longer, thereby limiting the utility of the resonant cavity tap even when several area used together to improve channel discrimination.

For example, were one to attempt to transmit video width channels (about $10^8$ pulses per second is required for digital, 500-line, three-color video transmission), the resonant-cavity tap system would present very substantial difficulties in making the resonant cavity small enough to accomodate the required spectral width and still provide suitable discrimination between channels to facilitate the clear reception of a desired channel.

There are a number of other constraints in the systems of the prior art, particularly those aspects of a communications system relating to the means for accomplishing a wavelength-selective reception, or transmission of a specific signal from, or to, the multiplexed single-fiber communications lines, e.g. trunk lines. As will be seen below, the inventor, has directed his efforts to solve such problems and make other improvements in such systems.

It has also been proposed in the prior art that heterodyning can be utilized as a technique for detecting and separating one signal from a group of signals being transmitted along a fiber. In general, this heterodyning technique comprises adding a strong unmodulated, spectrally narrow (heterodyne) signal to the group of signals, detecting this mixture, and electronically filtering out a beat frequency corresponding to the difference in optical frequency between the heterodyne frequency and the channel being selected. In general, heterodyne-aided discrimination, as contemplated in the prior art, has been adequate to select one channel from a set of only about 10 to 20 channels.

Other published art, not heretofore related to solution of problems addressed by the inventor, describes some of the characteristics of Raman scattering and, more particularly, Bfillouin scattering in optical fibers. (Ippen et al, pages 539–541, Appl. Phys. Lett., Vol. 21, No. 11 December 1972). Brillouin scattering also has been suggested for use in operation of lasers. An example of such a laser is discussed in U.S. Pat. No. 4,530,097 to Stokes.

Other publications relating to multiplexing or coupling in optical communications include articles by Tomlinson's *Applied Optics*, 16, pp. 2180–2194, August 1977; by Taylor in *Optics Communications* 8, pp. 421–425 August 1973; in *Applied Optics* 17, pp. 3253–3258; in *Fiber and Integrated Optics* 1, pp. 227–241 (1978); and *Bell System Technical Journal* pp. 2103–2132 September 1969.

This discussion of the background is necessarily made with full knowledge of the inventions disclosed herein. It is to be understood that the discussion herein of the various categories of prior art is in no way to be taken as an admission that anyone, before the present invention was made, has related the various aspects of the art one to another in addressing any problems addressed by the present inventor.

SUMMARY OF THE INVENTION

It is a principal object of the invention to provide improved communication systems of the type wherein many independent channels of information-bearing signals at closely-spaced optical frequencies can be transmitted and received with much improved discrimination via a single optical fiber.

Another object of the invention is to provide an improved means for tapping an information-bearing signal from a single optical fiber, e.g. from a fiber connecting one group of users to another group ("trunk line") or from a single fiber used to distribute signals to a number of users ("street line").

Another object of the invention is to provide new means to amplify the signal received from the trunk line using laser amplification according to the invention.

A further object of the invention is to provide a novel combination of a non-frequency-selective signal tap and, a wavelength selective amplifier for providing excellent discrimination in receiving a signal from a single optical fiber.

Particular objects of the invention are to take advantage of the spectral characteristics of stimulated scattering energy, such as stimulated Brillouin scattering (SBS), in tapping, modifying, and discriminating among optical signals.

Still another object of the invention is to provide a signal tap system, as discussed above, which removes only a small fraction of the available signal power (photons) across that portion of the signal spectrum, i.e. the portion other than that from which the desired signal is being removed.

A further object of the invention is to provide means to process SBS (or like scattering-effect energy) to provide a channel spectrum of improved width and shape.

Another object of the invention is to provide a high-gain amplifying means to provide more power for signal detection.

Another object of the invention is to provide an optical fiber tap means which accomodates variable polarization of an incoming signal.

A further object of the invention is to provide a system wherein means to obtain appropriate polarization sweep of an optical signal is utilized.

Another object of the invention is to utilize an effective pressure modulation in obtaining said polarization sweep.

Still another object of the invention is to provide a novel means, e.g. one based on a piezoelectric compression to obtain appropriate polarization sweep during each sweep cycle.

Conversely, other objects of the invention relate to means to selectively tailor signals to trunk lines for efficient transmission therein.

Other objects of the invention relate to means for selectively receiving signals of channel width less than the width of a stimulated Brillouin gain curve, including use of advantageous heterodyning procedures.

A further object of the invention is to provide a number of unmodulated signals to the receiver of information, along with the information-bearing signal, to provide useful reference in tuning, i.e. picking up particular channels from a relatively large number of information-bearing channels.

Another object of the invention is to provide a system incorporating a frequency-selective amplification means, e.g. as described above, which can perform a plurality of functions: e.g., it can be divided or switched in frequency to simultaneously select different information channels from a plurality of different optical fibers contained in a trunk line.

An object of the invention is to provide an improved laser head of the type adapted to emit a tunable narrow spectral line, and of particular value in the novel communication systems described herein.

Another object of the invention is to provide an improved laser system incorporating a multiple-cavity resonant structure utilizing a combination of fiber cores and fiber-encompassing structure.

Another object of the invention is to provide improved means for constructing and operating the laser and laser system mentioned above.

Other objects will be obvious to those skilled in the art on their reading of this disclosure.

The basic communication system of the invention advantageously uses stimulated scattering gain. A very useful amount of gain has been found to be achievable with low pump power levels. The system can achieve highly-discriminating, wavelength-selective amplification resulting from the controlled use of stimulated scattering from a primary power source ("pump") to achieve discrimination, at a detecting station, between a selected channel and other channels, while largely avoiding the injection of noise from the primary power source into the detector. This stimulated scattering process is a low power-requiring, low-noise means for facilitating the achieving of such discrimination.

The above objects have been substantially achieved by development of a system which comprises a non-frequency selective, partial power tap and a tunable amplification system for wavelength-selective amplification of the signal beam at a receiving station. The system advantageously utilizes the gain associated with stimulated scattering. However this stimulated scattering is used for highly selective signal amplification, i.e. to achieve much improved channel (i.e. signal-frequency) separation, hence a much improved ability to discriminate among even closely-spaced channels within the signal-carrying spectrum of the system. Yet, the system is readily adapted to tap broad-band (e.g. video) signals. In sum, the system provides a practical means to allow improved spacing efficiency between channels, and thus, to use a larger number of channels within a given signal spectrum carried by an optical fiber in a communications system.

The stimulated scattered beam is caused by interaction of an incoming signal and an amplifying, or pump, signal. Thus the precise nature of the stimulated beam is conveniently adjustable in response to the manipulation of the pump signal, which is conveniently tunable and may be looked at as serving, among other functions, as a "handle" by which one manipulates the spectral characteristics of amplification. This manipulation can be achieved by designers and built into a system or it can be utilized in the system once it is installed.

The type amplification described herein, can be applied in a number of ways, e.g. on the trunk line before tapping off onto a branch line or on the branch line after tapping of the trunk line, or on both trunk line and branch line. However, an important application emphasized herein is that wherein the scattering signal is utilized in conjunction with signal tap functions, e.g. amplification and discrimination at such detectors as used for telephones, computers, video equipment and the like. Also, even though stimulated scattering is a function of the physical properties of the fiber transmitting medium (e.g. fused silica optical fiber), the precise characteristics of a basic stimulated scatter waveform may be selected by attention to the selection of the spectrum of the optical pump, which is used as a source of stimulated scattered power.

A particular useful wavelength-selective amplification enlists the properties of stimulated backward Brillouin scattering. The gain curve associated with such scattering are believed to be most favorable for convenient introduction of the invention into commerce.

In multiplexing of optical communication signals to systems of the general type with which this invention is concerned, below, the signal in each optical frequency channel originates as a relatively narrow spectral line and is broadened by signal modulation. "Relatively narrow", in this sense, is defined as being much more narrow than the spectral width of the modulation. Such systems, when channel widths are minimized, have the advantage of facilitating the use of laser amplification, instead of electronic repeaters.

Use of laser amplification, however, has also involved problems for the art: For example, in laser amplification, a proper balance must be reached between minimizing power levels of the signal channels in the trunk line to avoid crosstalk from various non-linear optical effects; yet, sufficient power must be utilized to provide that large number of photons per signal pulse which is required to overcome the substantial noise levels inherent in laser amplification. Such inherent noise results from both spontaneous emission and from the quantum nature of the laser amplification.

Among known, non-linear, energy effects encountered in multiplexing systems are those known as four-photon mixing, Raman scatter, and Brillouin scatter. The problem presented by these phenomena is complex in the sense of the analysis of the various paramters which must be satisfied in overcoming the effects. Nevertheless, selecting a suitable power level for avoiding problems caused by these effects has been relatively easy in practice. For example, for closely-packed channels covering a total of $10^{12}$ Hertz of optical frequency, a fiber numerical aperture of 0.1, a fiber length of 10,000 kilometers, a bit error rate of less than $10^{-6}$, and an operating wavelength of about 1.3 micrometers (microns), one can use a total power of $10^{-2}$ watts, i.e. $10^{-6}$ watts per channel if 10,000 channels are used. (The power level discussed herein is that level immediately after each amplification in the trunk line. The level, of course, falls along the trunk line between amplifiers). This power level is not allowed to fail to much less than $10^{-7}$ watts before re-amplification.

Multiplexed systems using laser amplification have a disadvantage compared to those using repeators of requiring more closely-spaced amplifiers, along the trunk line to maintain power levels since only a relatively small drop is allowable between typical maximum and minimum power levels. While the $10^{-2}$-watt system illustrated above permits a drop of only 10 decibels, other systems will vary, perhaps allowing a 20-db. drop (or even greater drop) depending upon such parameters as fiber length, diameter, numerical apertures, number of amplifiers allowable, bit error rates, pulse rate per channel and other such parameters known to those skilled in the art of designing optical fiber communication systems.

Th signal-enhancing concepts on which the multiplexing systems of this invention are based is the tunable, wavelength-selective, laser amplification of an optical communications signal by careful mixing of a narrow spectral source such as a laser pump beam and a fraction of the optical signal power of the trunk beam in a single fiber. The invention is described herein with particular attention to stimulated Brillouin backward scattering resulting from said mixing. However it should be understood that signal-enhancing may be achieved by using other forms of stimulated energy, e.g. stimulated forward Brillouin scattering. Such forward scattering can be induced between an amplifying pump beam and a signal beam if the two beams are in different modes (e.g. modes of a bimodal fiber) or in different polarization states of different propagation velocities. Nevertheless, in presently-available bi-modal fibers, the forward Brillouin scattering gain is small.

When the non-modified stimulated scatter curve is too broad to discriminate between channels, the performance of the system can be modified by selective use of a resonant cavity tap in the system, or by heterodyning as described below, or by increasing the gain to narrow the curve as described below, or by combining the above procedures. In some cases, the transfer curve of the Brillouin scattering need not be narrowed to serve a useful function: it can serve to remove the influence of undesirable "tails" on the wider signal being received.

When the non-modified stimulated scatter curve is too narrow for the channel width, it can be broadened by switching or sweeping the frequency of the amplifying pump. The nature of the gain curve for Brillouin scattering is such that such frequency sweeping or switching improves not only the width, but also the effective shape of the gain curve. Also, mechanical fiber-stretching can be utilized to broaden the Brillouin curve as can other fiber-manipulating and -fabricating techniques mentioned below.

The basic spectral shape of the back-scattered gain can be selected by choice of hardware in the system. But this basic shape will often be either too narrow or too wide to be optimum for use in discriminating between certain incoming signal channels—which ideally would have a frequency widths that would allow them to fit under the half power width of the Brillouin gain curve. Thus it is desirable to build into the tap system certain amplification and discriminating features which allow the Brillouin gain curve to be manipulated. This is most advantageously achieved by manipulating the output characteristics of the pump.

ILLUSTRATIVE EXAMPLES OF THE INVENTION

In this application and accompanyng drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

IN THE DRAWINGS

FIG. 1 is a schematic diagram of a type of communications systems to which the present invention relates.

FIG. 1A illustrates schematically a laser-powered amplifier useful in a trunk line as shown in FIG. 1.

Figure 4:
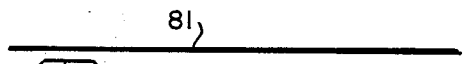
FIG. 4 is a schematic diagram of an optical communications system utilizing a non-frequency-selective, partial power tap and a means for wavelength-selective amplification according to the invention.
Figure 4A:
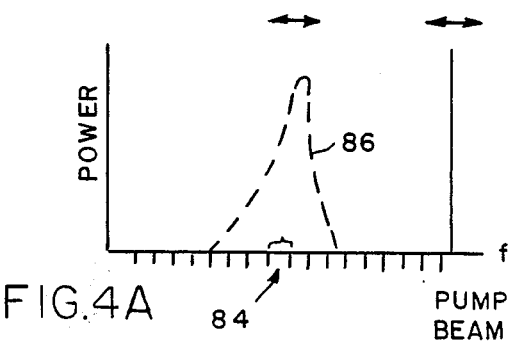
Figure 4B:
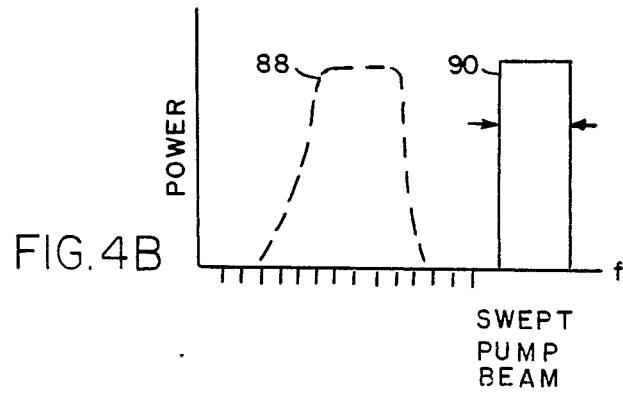

FIGS. 4A and 4B illustrate several aspects of the Brillouin scattering as it relates to the present invention: (a) wherein the signal channels from a trunk line falls under the Brillouin gain curve (4A); (b) wherein the Brillouin gain curve is swept by sweeping the pump beam to provide a wider and more ideal width and wherein shape of a linear-signal curve corresponding to gain curve of (4B) is set out.

Figure 4C:
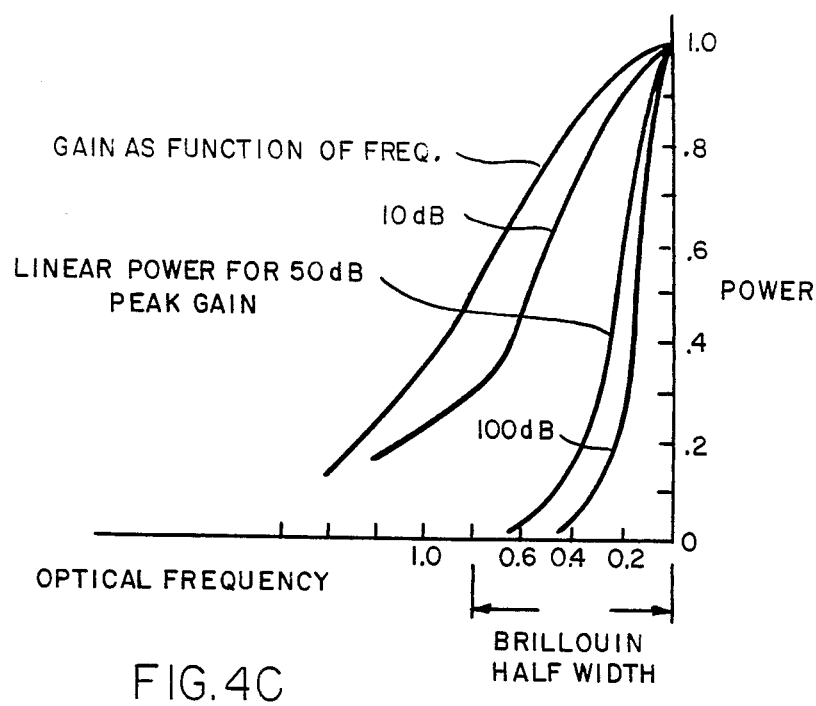
Figure 4D:
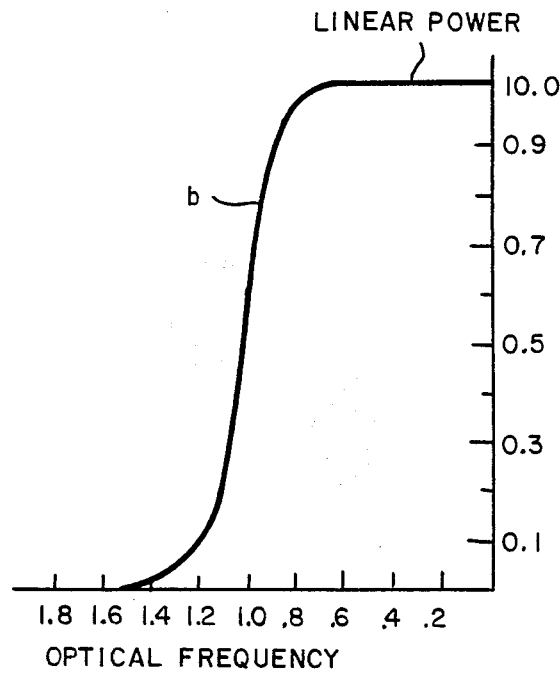

FIGS. 4C and 4D illustrate the effects of increased gain on Brillouin gain curve with and without frequency sweeping the amplifier.

Figure 5:
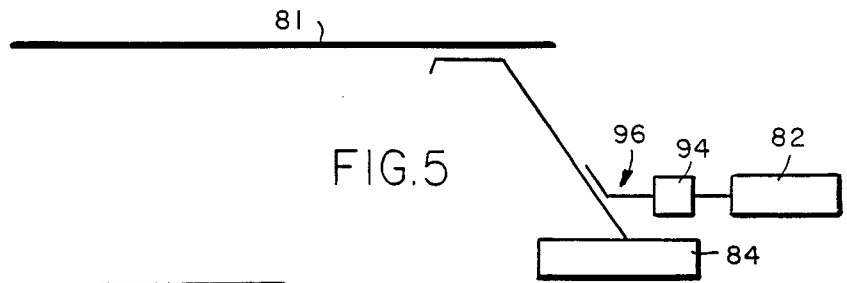

FIG. 5 is a generalized diagram of an optical circuit segment indicating use of a pressure vise to modify polarization characteristics of a pump beam.

Figure 6:
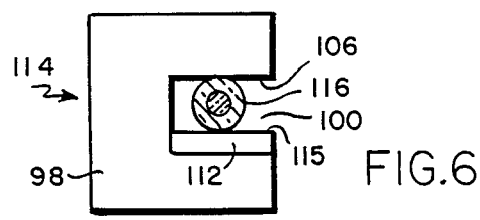

FIG. 6 is a schematic diagram of a piezoelectric device for pressure modulation of the polarization of the pump beam.

Figure 7:
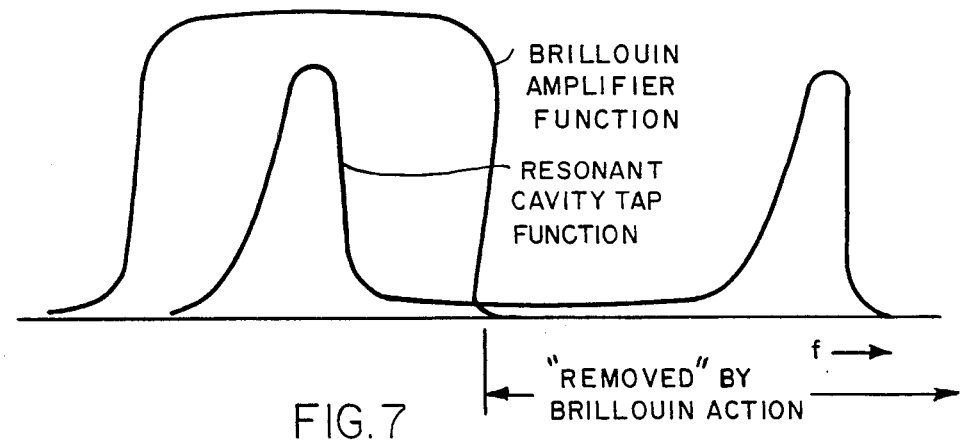

FIG. 7 illustrates schematically how a Brillouin transfer function tends to remove the tail of a resonant cavity, thereby performing a useful function in shaping the transfer curve of a resonant cavity tap.

Figure 8:
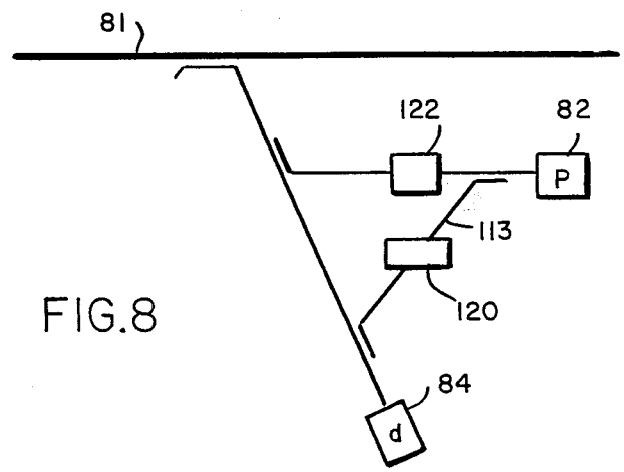

FIG. 8 illustrates a system utilizing a heterodyning procedure whereby the pump beam serves as a local oscillator.

Figure 9:
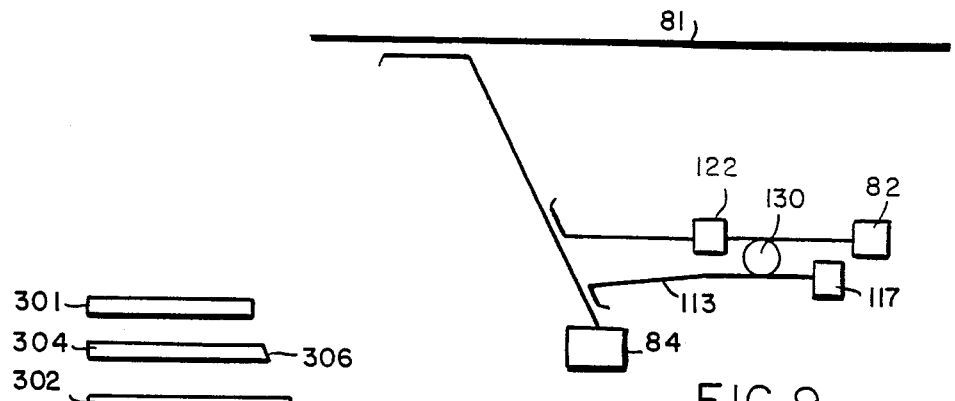

FIG. 9 illustrates, schematically, heterodyning of the pump before frequency or polarization shifting, to reduce the width of the total effective transfer function. FIG. 9 is a schematic diagram of an advantageous system for frequency shifting of the pump (laser) for use in heterodyning utilizing an acoustic wave and a resonant cavity tap to protect the pump (laser) to remove a counter-propagating shifted beam from being directed back into the pump and wherein the resonant cavity is tuned to transfer an unshifted pump wave without sweeping of the resonant cavity tap.

Figure 10:
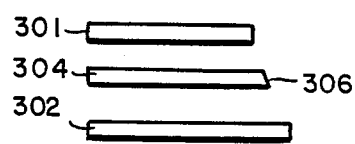

FIG. 10 is a schematic view of the components of a novel multiple-cavity fiber laser head.

Figure 11:
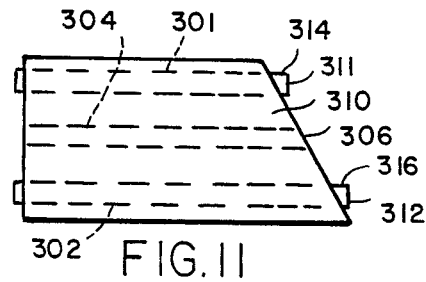

FIG. 11 is a plan view of the cavities in a fiber laser according to FIG. 10. The view is somewhat schematic to exaggerate dimensional differences.

Figure 12:
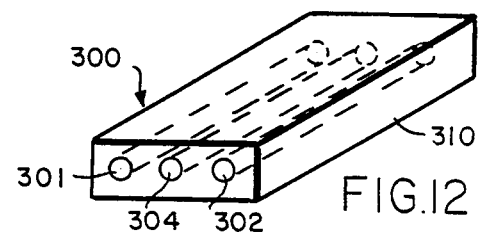

FIG. 12 is a perspective view of the laser of FIG. 11, showing the laser with fibers and surrounding cladding.

Figure 13:
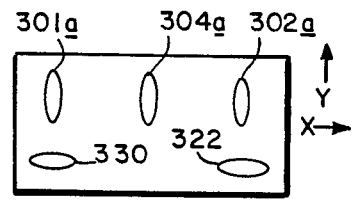

FIG. 13 is a schematic view of a laser of the general type defined in FIGS. 20–22 but having parasite cores to assure a preferential polarization.

Figure 14:
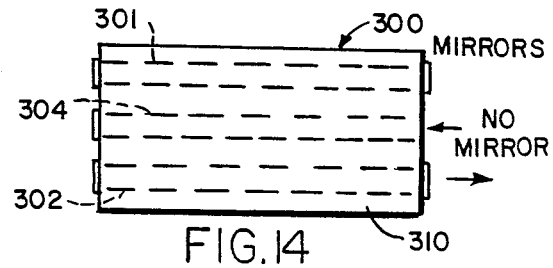

FIG. 14 shows a laser head embodying the laser of FIG. 13.

Figures 15, 16:
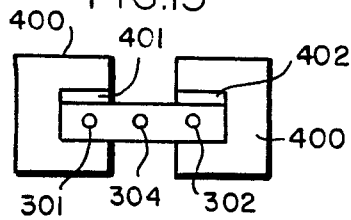

FIG. 15 shows the piezoelectric tuning of the laser of FIG. 14.

FIG. 16 shows as section of a preferred laser according to FIG. 13.

Figure 17:
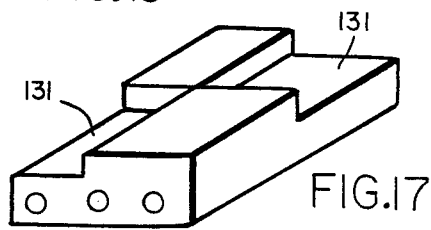
Figure 18:
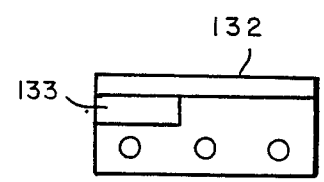

FIGS. 17 and 18 show one way to assemble a piezoelectric tuner with a laser.

FIGS. 19 and 19A–19D illustrate a polarization-controlling system.

FIGS. 20 and 21 help illustrate another way to tune a laser.

FIG. 1 illustrates a portion of a system of the general type to which the invention relates and improves upon. At the right hand side thereof are pictured a trunk line 50, communicating between signal sending stations 51 and signal-receiving stations 53 which comprise frequency-selective taps 52 tunable for receiving selected signal channels, from the trunk. Such taps are used in conjunction with detectors 58 associated with individual telephone or video receivers, but these end-use devices are not shown in the drawings per se, because their general details are well known in the communications art. The individual components such as a laser source and a PIN diode detector, or a modulator can be conveniently incorporated into the hardware of receiving instrument in view of the teachings contained herein and the ordinary skill of the art. Each sending station 51 comprises a modulator 54 (typically, an electrooptic modulator of the type wherein a changing electric field produces a change in optical path length of the light passing through a crystalline device on which the field operates, or a piezoelectric pressure modulator of the general type to be described below) and a "source" 56, i.e. a spectrally-narrow source of unmodulated light which conveniently orginates from a laser (again associated with a telephone or other such transmitter). Trunk line 50 will, where required, contain amplifiers 48. Off the lines to the right side of FIG. 1 are more taps 52 in association with detector means 58, usually P.I.N. diodes, well known in the fiber optics communications art. Thus we see a schematic system into which communications signals are fed from various sources, are amplified to transit, and are selectively tapped at appropriate receiving stations.

One advantage of the present invention over the general system of FIG. 1 is that is allows, although it does not compel, the use of non-frequency-selective taps at the detector stations.

An amplifier 48, of FIG. 1A is a laser amplifier, and advantageously, will comprise an optical segment 49 in situ within a trunk line 60. The segment 49 is advantageously neodymium-doped optical fiber which is pumped, in a manner generally known to the art, and by a laser diode 62. Of course, in the amplifier 48 the ends of the neodymium-doped segment 49 are not reflective (as they must be in a laser oscillator) since it is being used as an amplifier.

One mechanical means by which a fiber tap may be accomplished between the tap line and trunk line is described in U.S. Pat. No. 4,342,499, i.e. a short run of a tap fiber along the trunk fiber.

Figure 2:
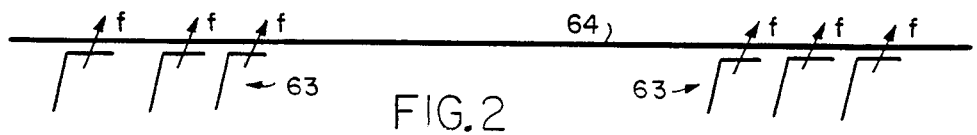
FIG. 2 is a graph illustrative of a routing switch of the type to which the present invention relates.

FIG. 2 is a schematic of a switching station made practical by the invention: Such a switch has the ability to handle a vastly higher number of channels, at least 3 to 4 magnitudes higher, then conventional electronic switching stations, because station tap can be used to switch between an extraordinary number, say a million or so channels. Each tunable, frequency-selective tap 63 requires only about one centimeter of access length along a switch station trunk line 64.

Figure 3:
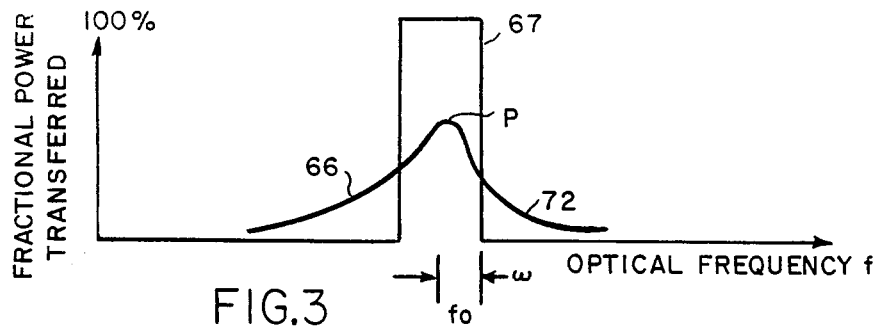
FIG. 3 is a schematic diagram illustrating the channel profile, i.e. optical frequency transfer function curve, exhibited by resonant fiber cavity taps of the prior art.

FIG. 3 is a graph schematically indicating the type of transfer function curve 66 that is generated by resonant cavity-type taps of the prior art. Comparison is made to an ideally-shaped curve 67 for use in discimination of signals. The undesirable "tail" 72 of the resonant cavity curve is approximately defined, for a range of several half-widths, w, of the transfer-function curve by the relationship $$\frac{P}{1+\left(\frac{f-f_o}{w}\right)^2}$$

wherein P=peak power transfer; w is the half-width of the transfer function curve; $f_o$ is the central resonant frequency, and f is the optical frequency.

FIG. 4 illustrates a simple form of a receiver system constructed according to the invention of the type utilizing non-frequency selective tap 80 from a trunk line 81 and a pump beam 82 (which is normally a laser) or primary source of narrow spectrum light of sufficient power to serve as amplifier means, in conjunction with a P.I.N. diode detector 84. The pump beam is the power source means for stimulated backward Brillouin scattering, moving counter to the incoming signal beam which is offset in frequency from, but manipulated by and responsive to, control of the pump beam. A gain curve of Brillouin scatter is represented as 86 on FIG. 4A. As seen in FIG. 4A, when the frequency of the pump is shifted as at 90, the frequency of the Brillouin gain curve is also shifted as indicated at 88. Thus the gain curve can be scanned over a wide range of optical frequencies or communication "channels" (schematically indicated along the bottom of the graph as discrete frequency channels 87 which are offset from the pump frequency).

In many cases, including the typical optical transmission of telephonic and digital data, the characteristics of the Brillouin back scatter transfer curve 86 is adequate or it can be easily adjusted, as will be discussed below, that shown in FIG. 4, so that a distinct signal channel 87 will fall with sufficient accuracy under the Brillouin gain curve. The normal width of a Brillouin gain curve in typical optical fiber is about $4 \times 10^7$ Hertz at a wavelength of one micron and varies inversely with the square of the wavelength. This is too narrow for certain signal channels (e.g. video).

In the case of some communication channels, such as video channels, the channels width will be several times as broad as the ½-width of the Brillouin gain curve.

As shown in FIG. 4B, the widening of the Brillouin curve is accomplished by sweeping. Merely switching back and forth between discrete frequencies is sometimes sufficient) the frequency of the laser pump beam creating a swept-frequency form shown at 90 to which the Brillouin curve responds as is shown at FIG. 4B—both shape and width of the gain curve is enhanced, allowing it to fall highly selectively over a desired channel.

In evaluating the efficacy, in the system of the invention, of systems exhibiting gain curves as shown in FIG. 4A, it should be appreciated that, if the total amplification is an exponential function, then the linear curve amplification corresponding to the gain curve becomes considerably narrower and has much steeper sides as the total gain increases. Thus, as one uses higher levels of amplification one achieves a more ideally-shaped Brillouin gain curve. (See FIG. 4C wherein the steady improvement in shape of the curve is shown as the amplification peak gain is increased from 10 db. to 100 db). This effect is enhanced further when one accomodates wide-band signals by use of a pump-frequency sweeping effect to be described below. See FIG. 4D wherein it is seen that a more ideal curve results from using 2 pump frequencies displaced by about the full width, at half power, of the Brillouin gain curve. Curve (b) shows 2 pump frequencies, halfway between the 2 of curve (a). Curve (c) shows 3 frequencies.

As indicated above, there are some information-transmitting tasks such as video communication in which the aforesaid Brillouin transfer curve might be too narrow. For example, wide band traffic such as video signals would not fall suitably under an unmodified Brillouin gain curve illustrated in FIG. 4A and are processed under the modified curve of 4B. Nevertheless, it has been found that such an unmodified curve is readily broadened to a gain curve such as that illustrated in FIG. 4B sweeping the pump frequency with, e.g., a saw-toothed time dependence function over a range of frequencies or, when adequate, merely switching between discrete frequencies. This achieves the more-ideally formed and functionally broader gain curve 88 of FIG. 4B in response to the swept pump beam frequency illustrated as at 90. The modifying sweep frequency to which the pump beam is subjected can be selected by using means whereby each time element of incoming communications signal will be exposed to an integral number of complete sweeps or switches during the signal's transit down the fiber.

It is another advantage of the tap system shown in FIG. 4 that operation at high gain delivers increased power to the detector and thereby tends to markedly decrease noise problems at the detector 84, conveniently a P.I.N.-type detector.

The non-frequency-selective tap used in the system in FIG. 4, will be operated typically, to remove and utilize only a fraction of the signal energy available in the desired incoming-signal channel.

The lower relative amount of tapped power can be readily compensated if necessary by delivery of a higher power level to the tap.

I have described a means for broadening the backward Brillouin gain curve consisting of sweeping the pump frequency to provide a curve like 88 in FIG. 4B.

An alternate means is to alter the propagation constant of the amplifying fiber (wherein the pump and signal beams travel in opposite directions). The offset in frequency between the pump and maximum gain is given, approximately, by:

$$\text{Delta } f = \frac{\text{Velocity of sound}}{\text{Wavelength of light}} \times 2 \times \text{propagation constant}$$

The offset in frequency will be, roughly, $10^{10}$ Hertz multiplied by the propagation constant.

When the wavelength being used is 1.0 micron, the propagation constant varies from a value equal to the core index of refraction to the cladding index of refraction as the wavelength varies from very short to very long. However, the variation in propagation constant which can be used without incurring excessive transmission loss and while being single mode is about ¼ times the difference between (a) the refractive index of core and (b) the refractive index of the fiber cladding. In commercially available fiber, this index difference is 0.01 or less. Therefore, the total shift in frequency offset which may be obtained by tapering a commercial fiber is about $0.4 \times 10^8$ Hertz. This is large enough to be useful. To improve the range of shift still further one could use a custom-made fiber with a greater numerical aperture or use two fibers butt spliced approximately midway with one fiber having a higher core index than the other. These techniques have the disadvantage of being non-adjustable once made so that one cannot alter the gain curve at will. However, with the general principles in mind, those skilled in the art can device other fiber combinations to be used as amplifiers, to widen the Brillouin gain curve. Changing the dimensions of the fiber, i.e. by stretching the fiber—more one end than the other thereby obtaining a tape, provides considerable broadening—without exceeding the breaking stretch of a well made fiber. Knowing this, one can readily device fiber stretching means which are easily adjustable to achieve the width of gain curve required.

A simple tap system as described above in FIG. 4, requires the use of relatively expensive polarization—maintaining fibers unless the system is modified. A polarization-compensating means 114—shown schematically in FIGS. 5 and 6—is placed over an optic fiber 116 to be used in carrying the pump beam.

One advantageous polarization-compensating means, that shown in FIG. 6, comprises a rigid support means 98 which has a recessed surface in which a recessed process zone 100 provides room for a piezoelectric pad element 112 and for fiber 116 to be inserted between surface 115 element 112 and an opposed surface 106 of means 114. The piezoelectric pad 112 has, as is known in the art, electrodes on opposite faces and voltage is applied to the pad in such a way as to cause optical fiber 116 to be cyclically squeezed by the device 114.

The frequency and severity of the squeezing action is selected to produce the appropriate polarization sweep. Thus, the x-axis of the pressure is set at 45° azimuth to the initial plane polarization of the pump beam.

The voltage-induced pressure-squeeze on the optical fiber creates a controlled bi-refringence in the fiber 116 which, together with the length of the vise, typically about a centimeter long, forms means to produce an integral number of half-wavelengths of phase-retardation difference between the two principal axes of polarization.

Thus the polarization of the pump beam is flipped through 90° an integral number of times during transit of the signal, i.e. 2n times during each cycle of the pump frequency sweep cycle where n is an integer.

A preferred method of operating such a piezoelectric device is to apply an amount of pressure in the zero voltage state (zero volts in pad) so that several wavelengths of birefringent path difference is introduced into the fiber. The amount of modulation sweep voltage applied carries the birefringence through an integral number of wavelengths of additional birefringent path-lengths. The proper voltage to achieve an integral number of wavelengths sweep will be reflected in an invariant signal output as the incoming signal changes polarization. One will use a microprocessor to accomplish this mode of control.

Returning to FIG. 4, there is seen that it can be more specifically described as a single detecting or receiving station of the type shown in FIG. 1, but explicitly showing a pump signal source 82 as a means used to control the stimulated backward Brillouin scattering: As indicated, pump beam opposes the signals being tapped from the trunk line. Pump tap 102 is designed to deliver about 90% of the pump signal to amplifier fiber 103. This also leaves 10% of the signal for the detector. This is quite adequate because 30 to 80 decibels of amplification is typical. The trunk tap 80 is 1% (−20 db.). Therefore, the net gain of the illustrated tap device is 30 to 80 minus 30 db., but adjusted to be great enough to raise the signal at the detector 84 well above the dark noise of the detector. Although the net gain is reduced by tap losses, the total Brillouin gain independent of losses is effective in differentiating the selected channel from other channels.

The type of tap illustrated at FIG. 4 can be combined with previously-known resonant cavity filters placed either in the line tap 80 or pump tap 102. This would be done, when the incoming signal power to be detected is too low and the use of a wavelength selective tap would serve as a means to permit transmission of increased power into the amplifier.

In this connection, it is noted that when the channel width to be detected is less than the Brillouin gain curve width, e.g. as illustrated in FIG. 4A, it is possible to use a resonant cavity-type tap (of the type already known in the art) either at the tap into the trunk line (at 103) or the tap between the amplifier and the detector (at 102) to further reduce the width of the transfer function. Even in a circumstance, wherein the transfer function remains wider than the channel being detected, the Brillouin-type amplification is of value, because it functions as a means to improve the shape of the gain curve by obviating the effects the "tails" on the transfer functions that normally characterize single stage resonant cavity taps. FIG. 7 illustrates this effect.

Resonant cavity taps need not be used in such "narrow-channel" circumstances. A heterodyning system may be used as is shown in FIG. 8. FIG. 8 illustrates a tap system, where not only is the pump frequency shifted (or switched between discrete frequencies) but a fraction of the beam from pump 82 is diverted, before it has been subjected to any broadening by frequency shifting, to the detector 84. Thus, the pump 82 may serve as a local oscillator beam 113 in a heterodyne system whereby the pump beam has the additional function whereby it is a means to combine with the incoming signal which is to be detected and received. The superimposition of these signals generates a so-called "beat" signal pattern which is a function of time, the beat frequency being equal to the difference in frequency between the incoming signal and the local oscillator. As is known in the optical instrumentation art, the resultant complex signal can be filtered electronically to detect the beat frequency. The local oscilator signal is introduced at much higher power than the incoming signal to be detected and thus provides additional gain. This simple heterodyning procedure allows detection of relatively narrow channels, but pump noise and detector non-linearity and noise limit the ability to separate clearly a selected channel from a large number of channels. As an approximate rule heterodyning can be used to select one channel from 10 to 20 adjacent channels.

When the pump beam is used as the local oscillator beam as generally shown in FIG. 8, the frequency difference between pump and incoming signal, often about $10^{10}$ Hertz, may be somewhat too high for some commercial detectors, although commercial PIN detectors are suitable in some applications. When it is found that a given detector will not respond adequately to this rather high difference in frequency, the pump, i.e. local oscillator, frequency can be shifted by an acoustic-travelling wave generating means 120. The choice between a more suitable detector or employment of such a means will usually be based on economic considerations.

When one decides to employ a down-shifting of the pump frequency, (as also seen in FIG. 8), one may use a frequency-shifting means 120. One such means may generate acoustic waves either counter to or concurrent with the local oscillator beam 113, shifting the optical frequency up or down, respectively. Whether shifted up or down, however, the shifted pump beam is reflected counter to the original optical (pump) beam. Therefore, it is often desirable to avoid the inefficiency inherent in such counter reflection and to remove the shifted beam. A non-selective tap would not be a preferred means for performing this function is most circumstances because of the substantial inherent loss of efficiency in the pump system. Therefore, use of a resonant cavity tap is usually justified.

However, if the acoustic generator is swept to broaden the gain curve of any such resonant cavity, its transfer curve function must be broad enough to accommodate the swept range or must be synchronously swept to stay in tune with the down-shifted beam. Referring to FIG. 9, it is seen that this necessity is avoided by utilizing the resonant cavity tap 130 as a means to transfer the pump beam before the beam is shifted. Thus, the system of FIG. 9 avoids the need to modify or sweep the gain curve of the resonant cavity. The resonant cavity tap is tuned to transfer an unshifted pump wave and the tap itself need not be swept. A frequency shifter 117 is used of the acoustic generator type.

For perfect phase matched reflection during heterodyning, an acoustic wave, as used in the device of FIG. 13 needs to have a wavelength of one half the optical wavelength (in the fiber). In the illustrated case, the frequency shift is equal to the Brillouin shift. To produce a shift slightly removed from the Brillouin shift, for example, by $10^8$ Hertz, one simply changes the acoustic frequency, but at some sacrifice in reflectivity since the phase match is not perfect. To function well, in such a situation, the interaction length should be less than 100 wavelengths. To produce a greater shift in the acoustic wave than this, one brings the acoustic wave in to the fiber at an angle. The acoustic frequency is increased by fixing the angle such that the projection of the acoustic wavelength along the fiber is again phase matched. This allows adjustment of optical frequency shift either up or down in absolute amount greater than (but not less than) the Brillouin shift. Thus the shifted pump frequency lies on the opposite side of the signal from the pump frequency.

Another procedure, preferred because of its simplicity, is to squeeze or stretch the fiber, as by piezoelectric means, to change the optical wavelength (in vitro) and then alter the acoustic wavelength and its reflection to stay phase matched with the pump beam. This allows a modest shift in either direction from the natural Brillouin shift and produces a useable beat frequency for heterodyning.

Another approach to heterodyninf useful in optical communications systems of the type described herein is to design the system to deliver an unmodulated signal to the user in addition to the information bearing signal.

Thus the spacing of the unmodulated signals is advantageously related so that only one such unmodulated "tag" signal is within the Brillouin gain curve with a plurality of channel signals. An electronic filter then determines which of the signal channels is used.

It has been assumed thus far, that a user of the system has been equipped to select an incoming signal by use of a tuning means, i.e. a means whereby—using this pump beam as a "handle"—he moves his Brillouin gain curve along the spectrum until it is tuned for reception of the desired channel. The problem is somewhat complex when the number of channels available can be very high, e.g. 10,000 to 1,000,000.

The unmodulated channels can be transmitted to the user on a separate fiber or can be the same fiber as the signals. In this situation, each unmodulated signal may be precisely centered on a principal information, i.e. signal-bearing, channel itself. The unmodulated signals serve a useful purpose as reference lines in tuning whether or not heterodyning is used in the system.

The "unmodulated" signals can bear low-band-width identifying "labels" imprinted on the unmodulated signals. Such label signals can be designed not to interfere with the principal information signal of the channel; thus, a message modulated at a very slow rate could be used as a non-interfering tag for a signal channel or a group of signal channels.

Thus in a 10,000 channel system each channel would bear a modulation consisting of a timing pulse followed by a second pulse in one of 100 time slots subsequent to the timing pulse and then by a third pulse in one of the time slots between 100 and 200 subsequent to the timing slot. These two occupied slot numbers read directy the 4 decimal digits representing the channel number.

When this "tag" modulation is combined with the signal channel the tag modulator pulses can be 10 to 100 times as long as the signal pulses and at 1/10 to 1/120 of the normal signal power. This avoids interference with the signal. As an alternative the tag pulses can be normal length and intensity but in an unoccupied time zone set aside for this purpose. This would, for example, create a silence of about 1/1000 of a second in a voice channel. The detection and voice reconstruction system would be designed to bridge the silent zone by speeding up transmission on either side of the zone and slowing down detection on either side.

Lasers which can emit a narrow spectral light signal and can be tuned are already known in the art. Nevertheless, a laser which is particularly well adapted for use in the system of the invention is described herein and is disclosed in the drawings at FIGS. 10-18.

FIGS. 12 and 14 show the fibers utilized in the fiber laser 300 of FIG. 12. The outermost fibers 301 and 302 are resonant fibers each of which is laterally and optically coupled to a central fiber 304. The resonant fibers 301 and 302 are doped with a material such as neodymium or erbium as is known in the laser art. The central fiber 304 can be doped, or left undoped. The fibers 301 and 302 will be reflective at each end. At least one end of the bleeder fiber 304 will be open to allow escape of any power in that fiber.

The frequency at which the side cavities tend to resonate is determined by the length of their optical paths. Each of side cavities 301 and 302 is optically coupled into the central cavity 304 with sufficient efficiency that a substantial fraction of its power is lost to the central cavity during one traverse of the cavity.

Thus the laser comprises phase-matched lateral couples as described in U.S. Pat. No. 4,315,666. Typically, adjacent cores are spaced by less than 2 core diameters over a laser length of 1 to 5 cm., and the space between cores is filled with normal optical fiber cladding material.

Light entering the central cavity exits at an unmirrored end 306 and is "lost". However, side cavities 301 and 302 are operated at a common resonance frequency and operated 180 degrees out of phase with one another. This assures that the transfer of one cancels the transfer of the other and there is no net power loss from either side chamber.

The side chambers, when optically pumped, oscillate at that frequency under the doping gain curve of the two side cavities which incur the smallest loss of efficiency. This will be that frequency at which the product of the laser grain and cavity efficiency is maximized.

If the side cavities 301 and 302 are Vernier tuned, i.e. do not have identical spacings between resonant orders, they will still have one principal common resonant order which will be dominant. The next, or secondary, adjacent, common order will be far down on the gain curve of the side cavities and separated from the "principal" common resonant order by an extended free spectral zone.

Such a device, when operated, will tend to oscillate with a narrow spectral line width can be tuned by minute changes in its dimensions, and has little tendency to hop to any secondary resonant orders.

The three optical cavities, 301, 302 and 304 described above are phase matched. Therefore, the difference in optical length of one of the side cavities must be obtained by having one chamber extend beyond the length of the other side cavities as seen in FIG. 11.

One convenient way to construct such a device is to do so in a multi-fiber construction wherein all of the cavities are drawn down together from a preform and in common cladding material, or matrix, 310. Such a device is shown in FIGS. 11 and 12. A suitable design results in single mode cavity cores.

This laser pump described is an improvement on the generally-described, Vernier-tuned-lasers and differential-length lasers described in International Application (PCT) WO83/02168.

Such a laser, as generally shown in FIGS. 11 and 12, must have the difference in cavity length, typically of the order of 0.001 to 0.01 of the total cavity length. One method for achieving this differential length is to terminate, as by a grinding/polishing step, at least one end of the laser at an angle. Where mirrors 311 and 312 are required at an angled surface, end fittings 314 and 316 for such mirrors are used as a means to preserve proper reflection and returning light to the respective cavity at the proper normal angle.

This mirror-implemented, angle correction often results in loss of some light energy because of the difficulty of placing a mirror directly over a cavity. However, the method is practical to obtain sufficiently good placement of the mirrors to achieve useful laser pumps.

A preferred embodiment of this laser achieves the desired difference in length between the two resonant chambers in the manner shown in FIG. 20 (Fibers within laser body shown, only). This is achieved by taking a piece of the composite fiber containing the multiple cores and cleaving it. The two surfaces formed by the cleave are polished and one side chamer is mirrored at a cleaved end 440. This can be achieved by mirroring the entire end and subsequently blowing the metallic coating off (with a focused laser beam) of the area to be un-mirrored. The two pieces 446 and 448 left by the cleave are cut to desired length (about 1 cm. for one piece and about 1/100 cm. for the other) and polished. The distal ends 442 can be completely mirrored except for at least one end of the central (bleeder) fiber. The two pieces are then carefully aligned and glued together again at the cleaved surfaces.

This gives a goodd solution to the differential length problem.

In a similar manner one can render the embodiment shown only schematically in FIG. 21 (Fibers within laser body shown, only). This derives from 2 cleaves 450 but now the two end pieces 451 and 452 differ in length by about 1/100 cm. and are each about 1/10 cm. long, the center section 453 being about 8/10 cm. long. What we accomplish here is a means for differential tuning of the device. We now apply the piezoelectric tuning clamps as seen in FIG. 6—one to each end piece. Since only one side core is functional in each end piece the tuner on one end tunes only one side cavity and the tuner on the other end tunes the other side cavity. (It is also possible to tune one end piece and the long center section. In this case the end tuner affects one chamber and the center chamber affects both chambers. Thus in an approximate way the end tuner selects the coincident order so is the coarse tuner and the center tuner is the fine tuner).

Those skilled in the art will know that each mirror should cover more than just the end of the core, since light also travels outside the core. In a very approximate way the mirror should cover a diameter twice the core diameter (more if very high reflectivity is required and less if not so high reflectivity is required).

In use of such a laser head as described above, it is desirable to maintain oscillation of the laser with constant polarization. One way to accomplish this is to provide that all three fiber cores 301, 302 & 304 be birefringent thereby forming means to maintain different condition for reasonance for the two polarizaton states. In such a case, it would be only coincidental (and unlikely) that both states would be at the same frequency. (On tuning the device in all probability only one of the birefringent modes along a principal axis of polarization would be oscillating at a given time. The operator would not know which birefringent mode was oscillating, but once the oscillator was tuned, this would be of little or no consequence is his operation of the laser head.

However, in some systems, the probability of the polarization jumping from one state to another would be high enough to be unacceptable. In such situations, it is possible to construct the device to discourage a second polarization state by adding additional "parasite cores" as shown in FIG. 13. The new cores 330 and 332 are elliptical in shape as are the modified cores 301a, 302a and 304a. Cores 330 and 332 are not reflective, i.e. the ends are not mirrored. They form means to phase match to one polarization state only.

The elliptical fibers typically have a minor to major axis ratio about 1:2 to 1:5.

In this embodiment of FIG. 13, the birefringence is imparted by the shape, e.g. elliptical shape, of the cores. The y-axis polarization of 301a matches the y-axis polarization of 330 but the x-axis polarization of these fibers is much different. Because this is so, the y-axis polarization of 301a and 310 are relatively more strongly coupled than any x-axis polarization. The same is true also for the cores 332 and 302a.

Thus, the x-axis polarization is dominant in the FIG. 13 laser. The increased losses in y-axis polarization assures oscillation in x-axis polarization only. Oscillation takes place in the cavity with the least power loss.

It is possible to tune a laser of the type shown in FIGS. 11–13 to operate in at a different laser spectral region, e.g. in the illustrated case at the 1.3 micron laser region of neodymium instead of the 1.05 micron region. (The 1.05 micron wavelength has higher gain; although, in some systems, the fiber transmission characteristics at 1.05 microns may be inferior). This is achieved by designing cores 330 and 332 to be dispersive relative to 301a and 302a and, also, to be phase-matched at 1.05 microns, but not at 1.3 microns. This procedure suppresses oscillation at 1.05 micron wavelength.

Still another novel construction utilizes, as tuning means, dielectric mirrors which are designed to reflect 1.3 micron wavelength energy and not to reflect, with any substantial efficiency, 1.05 micron wavelength energy.

Power is extracted from the laser described herein by allowing a mirror at one end of one side core to be sufficiently transparent to pass 5 to 20% of the incident power. The rest of the energy is being reflected back into the apparatus. The energy thus transmitted from the laser is fed directly into an optical transmission output fiber which can be conveniently butt-coupled to this partially reflectively mirrored end.

Another way of transmitting power from the laser is to couple an output energy-receiving fiber to an end of the central cavity 304.

In this 3-fiber type of laser device being described in FIGS. 10-20 typical dimensions of the device are 55 microns width of the fiber-supporting matrix 15 microns from a periphery of the matrix to a cavity, 5 microns diameter for the cavity, 5 microns between cavities and 35 microns in thickness. The 15 microns is really optical insulation as well as a mechanical support. The 5 micron distances between cavities allow the desired coupling. The cavity diameters are selected according to a wavelength and numerical aperture of the cavity material, as known in the optical fiber art.

A firm support or vise 40 is used to hold 2 piezoelectric pads 401 and 402 in contact with a laser as described in FIGS. 10-20.

The piezoelectric pads, as is known in the art, are operated via electrodes on opposite faces to produce a cyclical squeezing action.

Piezoelectric pads are then used to produce a frequency and severity of squeezing action to produce the appropriate pressure to the two side chambers for tuning. The differential pressure between the two side chambers will determine which resonant orders are selected between the Vernier-tuned chambers. The common pressure will determine the exact frequency of tuning.

By tuning the two cores, differentially or in unison, one can provide a frequency sweep through the gain curve of the neodymium-doped glass core 304.

The laser described above must be powered by an exterior source. This can be done by using a laser diode, of the type known in the art, with its input being fed into one end of each side core 301 and 302. The side chambers 301 and 302 have dielectric mirrors designed to pass the laser diode wavelength, and, thus, the diode forms means to pump the laser. This general arrangement is understood in the art and the mechanics for such a coupling of laser diode to the laser of FIGS. 10-20 are known.

However, FIG. 16 illustrates an improved pumping arrangment wherein an intermediate light conducting region 420 is placed around the laser structure previously described. This region is a means to conduct energy from the laser diode into the lateral, e.g. cylindrical, surface of the side cavities.

The indices of refraction of the device shown on FIG. 16 are selected such that the index of refraction of the cavity core is greater by an increment of about 0.013 than the index of refraction of the material 422 through which coupling takes place and the region 420 has a lower index of refraction than region 422. In such an arrangement light injected into the material surrounding 422 the core is not free to enter the "light insulating" region 420 but is free to enter the cores.

Thus pump light from a laser diode can be allowed to flow into the region surrounding the lateral chambers and it will be able to enter the side cavities 301 and 302 along their lateral surfaces. This particularly valuable mode of operation as the laser design length increases, i.e. as the ratio of cavity length is increased relative to cavity cross section.

In the laser shown in FIGS. 10-16, power may be extracted from the central core by coupling the central core more tightly to one side chamber than to the other side chamber.

There are a number of ways to construct the piezoelectric pressure-device. One method is disclosed in FIGS. 17-18 wherein a laser according to FIG. 15 is preferentially etched etched as indicated in FIGS. 17 and 18. The piezoelectric pad etched has one electrode along its length on one side and has two electrodes on the opposite side so that applying voltage to one electrode only on the split side applies pressure to the unetched core only and applying voltage to the other electrode applies pressure to the other core only.

It is to be particularly noted that the stimulated-scattering amplification and discrimination described herein is also useful in introducing discrete signals to a trunk line.

One way to achieve this is to use the same pump beam that is used to select the received signal to amplify an outgoing signal.

For example, assume one wants to send signals from a Brillouin-type receiving station, e.g. a telephone device: A narrow-frequency outgoing signal is modulated and introduced into the trunk line by an achromatic, i.e. non-frequency selective, tap. Usually one will wish to transfer only a small fraction of the power through this tap to avoid removing signals already on the line from upstream. Because of this resulting power sacrifice, it is desirable to amplify the signal by, e.g., 20 db., before introducing it onto the trunk line. This is conveniently done with any spectrally-narrow amplifier, such as a laser amplifier. It may be accomplished conveniently by use of the pump-beam amplifier already used in the Brillouin detecting system of the telephone.

Also, it is advantageous to utilize the Brillouin amplifier discriminating capability to modify the spectral distribution of these outgoing signals to refine their spectral content. For example, a Fourier transform curve of a square wave pulse-code-modulated signal can be modified to eliminate the "tails" beyond first point on the waveform. Thus, each signal will span a smaller range of optical frequency, $f_o$. This procedure, of course, will also improve the discrimination and receptivity of the signal at a receiver. From the signal-input point of view, it allows more signals to be placed on a single line.

One interesting aspect of the signal-sending procedure is to send only a one-half of the Fourier transform of the modulated signal. This signal can be heterodyned against a strong local oscillator at the receiving end and the full Fourier transform can be reconstructed. This procedure can be used to advantage in a number of ways, one of which is by allowing more closely-packed signals in the trunk line. It also allows one to utilize a receiver having an amplifier gain curve which is only one-half as wide as the full Fourier transform. For example, the Brillouin gain curve has about a $4 \times 10^7$ Hertz width at half gain points at 1.05 microns optical wavelength and about $2.4 \times 10^7$ Hertz at 1.30 microns wavelength. Commercial video signals (3-color, 500 line) use about $8 \times 10^7$ pulses per second.

This gives a frequency spread of about $16 \times 10^7$ for such a signal. This is wider than a Brillouin gain curve at either wavelength. Therefore it is advantageous to transmit only the half-spectrum. This requires less gain-curve broadening pump sweeping or switching at the receiver station and also reduces the pump power requirement to half. Alternately, one may reduce the fiber length by one-half.

The polarization state of the signal on the selected channel is variable in time. Stimulated Brillouin scattering occurs between corresponding polarization states of signal and pump beams. Therefore, if the pump is linearly polarized and the signal is also linearly polarized, but at 90° to the pump, then amplification will vanish. The system will be supplied with enough power at the detector to cope with variable amplification but not vanishing amplification. Therefore, in a preferred embodiment the polarization state of the pump beam is varied to "track" the polarization state of the signal beam.

The simplest embodiment comprises a length of amplifying fiber (wherein the pump and signal interact) which is a polarization maintaining fiber. Since this fiber can be wound on a drum and is not subject to the same perturbations as a street fiber this is readily accomplished. The tapped signal will deliver a portion of its power to one principle axis of the amplifying fiber and the other axis carries no less than 50% of the signal energy. The pump beam is switched from one principal axis (for a sample) and then to the other axis. The one which yields the greater power to the detector is chosen as the proper axis for the pump. The polarization state of the incoming signal does not vary rapidly but it varies. Therefore, the pump beam is programmed to switch to the axis it is not already using every time the power drops appreciably below 50% (for example 40% to 45%). A piezoelectric device has been described above which does this.

In the next level of sophistication, the device makes a correction on the incoming signal before it traverses the amplifier fiber. Whatever its polarization state the signal can be described as having an amplitude Ex in one plane and Ey in a plane at right angles to the first and a phase relation of "theta" in time between these two amplitudes.

This requires a mechanically rotating second vise 150 to adjust the angle "phi" to allign Ex into EI. This is both slow to respond and expensive.

Therefore, a preferred embodiment as shown in FIG. 19 aligns the second vise permanently at an angle of $22\frac{1}{2}°$ to the axis I. If x' is less than $22\frac{1}{2}°$, the second vise is not activated. If it is anywhere between $22\frac{1}{2}°$ and $67\frac{1}{2}°$, it is activated. In that way, the plane polarized signal will be at most $22\frac{1}{2}°$ off of the I axis or the II axis. If it is within $22\frac{1}{2}°$ of the II axis, then 180° of additional retardation is added to the first use which brings the plane back to within $22\frac{1}{2}°$ of the I axis. In this way the pump can always be left aligned on I. When this is all done then there is no less than $(\cos 22°)^2$ of the signal energy on I. (That is, no less than 90%).

A convenient way to carry out this process is to apply a voltage to the second vise which is known to produce 0° phase retardation and sweep the voltage of use one through a range known to produce a phase sweep of 0° to 270°. This will produce some maximum output at the detector corresponding to some sweep voltage on the first use. Now the voltage on the second use is increased to an amount known to produce 180° phase retardation.

The sweep on the first use is repeated and a second maximum is recorded. If it is higher than the first, the device is left in that condition. If the first maximum was greater, then the device is returned to that condition.

Now the device continually tunes the first vise to produce peak signal. If this peak falls below 80% for example, the second vise is turned off. If that doesn't bring the signal over 80%, then the first vise adds or where x and y are arbitrary. A device which converts these into a plane polarization Ex' and rotates x' to match an amplifier fiber principle axis (and the pump beam polarization) will deliver more power to the detector.

A piezoelectric vise, as already described, is oriented arbitrarily and a voltage is applied which is varied until the signal becomes plane polarized. As it leaves the vise, the signal will now be polarized along Ex' where x is some plane other than a principle axis of the amplifier fiber. A second vise is rotated to apply pressure to the fiber on an axis half way between x' and a principle axis. Then enough pressure is applied to produce 180° of retardation which switches the signal polarization to the principle axis substracts 180° of retardation. Now the signal will be above 80% and the first use goes back to hunting to peak the signal. See FIGS. 19, and 19a through 19e.

It is also to be understood that the following claims are intended to cover all of the generic and specific features of the invention herein described and all statements of the scope of the invention which might be said to fall therebetween.

What is claimed is:

1. A process for improving the reception of an incoming optical signal within an optical frequency spectrum by creating stimulated scatter in an optical fiber between said incoming optical signal and a spectrally-narrow control beam, said scattering having a characteristic gain curve defining power amplification as a function of optical frequency difference between said incoming signal and said control beam and utilizing said control beam as means to amplify a selected portion of said optical frequency spectrum.

2. A process for improving reception of a selected optical signal removed from a trunk line carrying a large number of signals by creating a stimulated backward Brillouin scatter between said selected optical signal and a spectrally-narrow control beam and adjusting the characteristics of said backward scatter with said control beam to enhance said reception.

3. A process for selectively improving reception of a selected optical channel within a signal comprising a number of optical channels by creating a stimulated backward scatter between said optical channel and a tunable spectrally-narrow control beam, and adjusting the characteristics of said backward scatter with said control beam to enhance said reception.

4. A process of selectively receiving an incoming optical communications signal from a plurality of signals carried along an optical communications fiber comprising inducing stimulated scattering in said fiber by interaction of said incoming signal with an amplifying signal from a spectrally-narrow optical amplifying means; which amplifying means is offset in frequency from said incoming signal frequency.

5. A process of selectively receiving an incoming optical communications signal from a plurality of signals carried along an optical communications fiber comprising (a) inducing stimulated scatter in said fiber by interaction of said incoming signal with an amplifying signal from a spectrally-narrow optical amplifying means; which amplifying means is offset in frequency from said incoming signal frequency;

(b) and adjusting characteristics of said amplifying beam as a means to utilize the gain curve defining the relationship between power amplification and optical frequency of said stimulated scatter in selectively improving discriminating said incoming signal from said plurality of signals.

6. A process as defined in claim 1 wherein said stimulated scattering is modified by broadening the spectrum of said control beam such that said gain curve is broadened to more nearly correspond to the frequency distribution of said incoming signal channel.

7. A process as defined in claim 1 whereas said stimulated scatter is modified by altering the properties of that fiber in which amplification takes place along the length of said fiber.

8. A process as defined in claim 7 wherein said altering of properties is achieved by tapering of said fiber in which amplification takes place.

9. A process as defined in claim 7 wherein said altering of properties is achieved by butt-splicing two optical fibers approximately mid way along said fiber which amplification is to take place, one of said two fibers having a higher core refractive index than the other of the two fibers.

10. A process as defined in claim 6 wherein said broadening of said gain curve is achieved by switching said control beam between frequencies.

11. A process as defined in claim 10 wherein said gain curve is broadened by sweeping said control beam between frequencies.

12. A process as defined in claim 1 wherein said stimulated scatter is modified by manipulating said control beam by narrowing said gain curve of said stimulated scatter to more nearly correspond to the frequency of a said incoming signal channel which is narrower than gain curve exhibited by said stimulated scatter before said narrowing.

13. A process as defined in claim 12 wherein said narrowing of said gain curve is carried out by increasing the gain of said stimulated scatter by an increase in power of said control beam.

14. A process as defined in claim 12 wherein said narrowing of said gain curve is carried out by changing the length of said optical fiber.

15. A process as defined in claim 1 wherein said stimulated scatter is Brillouin back-scattering.

16. A process as defined in claim 11 wherein said stimulated scatter is Brillouin back-scattering.

17. A process as defined in claim 3 wherein said stimulated scatter is Brillouin back-scattering.

18. A process as defined in claim 6 wherein said stimulated scatter is Brillouin back-scattering.

19. A process as defined in claim 1 comprising the steps of heterodyning said incoming signal with a local oscillator beam and detecting the resultant beat frequency to produce a narrower-frequency signal as said selected portion of said optical frequency portion.

20. A process as defined in claim 1 comprising the steps of heterodyning said incoming signal with a local oscillator beam and detecting the resultant heat frequency.

21. A process as defined in claim 20 wherein said local oscillator beam is derived from the control beam.

22. A process as defined in claim 21 comprising the step of down-shifting the frequency of said control beam with an acoustic travelling wave.

23. A process as defined in claim 21 comprising the step of down-shifting the control beam frequency.

24. In a communications system of the type wherein a large number of incoming optical signals are introduced into, transmitted along, and removed from an optical fiber at different receiving stations, the improvement wherein a receiving station comprises means for generating stimulated scatter between one of said incoming optical signals and a spectrally-narrow control beam.

25. A signal-receiving station for use in receiving and discriminating a discrete optical signal from a plurality of such optical signals tapped from a single fiber, said station comprising means to create a spectrally-narrow control beam as means to achieve selective amplification of said incoming signals.

26. A system for receiving incoming optical signals from a first optical fiber carrying a great many such signals, said system comprising
(1) a non-frequency-selective signal forming means to tap a plurality of signals from first fiber, a second fiber leading from said first fiber to a signal-receiving station; and
(2) a tunable laser amplifier as part of said receiving station, said amplifier forming means to select and amplify a signal in said second fiber.

27. A system as defined in claim 26 wherein said tunable laser amplifier forms means to control stimulated scattering, formed by interaction between a beam from said laser and an incoming signal, to improve discrimination of said incoming signal from other signals.

28. A system as defined in claim 27 wherein said stimulated scattering is Brillouin back-scattering.

29. A monolithic laser head comprising a central cavity forming oscillator means optically coupled to two phase-matched cavities, one on either side of said oscillator means, all said cavities within a common matrix which forms a path for said coupling.

30. A laser head as defined in claim 29 wherein said phase-matched cavities differ in length.

31. A laser head as defined in claim 29 comprising tuning means mounted thereon, said tuning means being means for achieving differential and controlled mechanical distortion of said phase-matched cavities.

32. A laser head as defined in claim 29 comprising further parasitical cores within said matrix, said parasite cores forming means to preferentially suppress oscillation of one polarization state.

33. A layer head as defined in claim 32 wherein all phase-matched cavities are elliptical in shape.

34. A laser head as defined in claim 29 wherein said common matrix is a light-conducting matrix having a cross-section forming means to receive light from a laser source along said cross-section and conduct said light for various distances along the sides of said phase-matched cavities and thence into said phase-matched cavities.

35. A laser head as defined in claim 33 comprising an exterior matrix around said light-conducting matrix, said exterior matrix being an effective barrier to light tending to leak from said light-conducting matrix.

36. A laser head as defined in claim 33 wherein said ratio of diameter of a said cavity to the length of a said cavity is at least about 100 to 1.

37. A system as defined in claim 52 additionally comprising means for utilizing said control beam as means to improve signal receptivity of said one of the incoming optical signals by fixing the characteristics of a gain curve, defining the relationship between optical frequency and power amplification of said stimulated scatter, in amplifying relationship to said one of said incoming signal.

38. A station as defined in claim 25 wherein said selective amplification is carried out by using a stimulated scatter beam to discriminate between said incoming signals and said discrete optical signal by adjusting the relationship between optical frequency and power amplification of said scatter beam.

39. A system as defined in claim 26 wherein said tunable amplification comprises means to provide a backward Brillouin amplification system, said system including means for selecting a signal transmitted along said second fiber to said receiving station from said non-frequency-selective tap.

40. A process as defined in claim 1 comprising the further steps of heterodyning said incoming signal with a local oscillator beam and detecting resultant beat frequency to produce an electronic signal suitable for further frequency filtering.

41. A process as defined in claim 1 comprising the additional and subsequent steps of heterodyning said incoming signal with a local oscillator beam and detecting the resultant beat frequency.

42. A process as defined in claim 41 wherein said stimulated scatter is Brillouin back-scattering.

43. A process as defined in claim 19 wherein said stimulated scatter is Brillouin back-scattering.

44. A process as defined in claim 40 wherein said local oscillator beam is derived from the control beam.

45. A process as defined in claim 44 comprising the step of down-shifting the frequency of a control beam with an acoustic travelling wave.

46. A process as defined in claim 44 comprising the step of down-shifting the control beam frequency.

47. In a communications system of the type wherein a large number of optical signals are introduced into, transmitted along, and removed from an optical fiber at different receiving stations, the improvement wherein at least one of said receiving stations comprises means to generate stimulated scatter between a selected incoming optical signal and a spectrally narrow control beam, and to achieve selective amplification of said selected incoming optical signal.

48. A signal-receiving station for use in receiving and discriminating discrete optical signals from a plurality of incoming signals tapped from a single fiber, into a second optical fiber, said station having amplification means including means to form a spectrally narrow control beam for amplifying and discriminating said incoming signals and means to control the characteristics of stimulated scatter formed between said incoming signals and said control beam.

49. A system for receiving optical signals from an optical fiber carrying many optical signals, said system comprising
(1) a non-frequency-selective signal tap forming means to obtain a plurality of channels from said line; and
(2) a tunable laser amplifier system for selecting one channel from said channels transmitted through said non-frequency-selective tap.

50. A system as defined in claim 49 wherein said tunable lase amplifier is means to create Brillouin back-scattering for interaction with said one channel.

51. A monolithic laser head comprising a non-resonant core phase matched to, and laterally coupled to, two resonant cavities, all said cavities within a common matrix.

52. A laser head as defined in claim 51 wherein said resonant cavities differ in length.

53. A laser head a defined in claim 51 comprising tuning means mounted thereon, said tuning means being means for achieving differential and controlled mechanical distortion of said phase-matched cavities.

54. A laser head as defined in claim 51 comprising further non-resonant cores within said matrix, said further cores as means to preferentially suppress oscillation of one polarization state.

55. A laser head as defined in claim 51 wherein said further non-resonant cores are elliptical in shape.

56. A laser head as defined in claim 51 wherein all phase-matched cavities are elliptical in shape.

57. A laser head a defined in claim 51 wherein said common matrix is a light-conducting matrix forming means to receive light from a laser source and conduct said light along the length of such phase-matched cavities and into said phase-matched cavities.

58. A laser head as defined in claim 57 comprising an exterior matrix around said light-conducting matrix, said exterior matrix being an effective barrier to light leaving said light-conducting matrix.

59. A laser head as defined in claim 57 wherein ratio of diameter of said cavities to the length of said cavities is at least about 100 to 1.

60. A tunable fiber-optic amplifying apparatus for amplifying optical radiation in a selected channel, said apparatus comprising a pump control beam, an optical path, and means for directing said optical radiation and said control beam to travel in different directions along said path, said control beam being spectrally relatively narrow and of a higher optical frequency than the frequency of said selected channel, said optical path being in a material which is means to cause said control beam to undergo appreciable stimulated scattering by said radiation.

61. Apparatus as defined in claim 60 wherein said optical path is an optical fiber and said radiation comprises a plurality of optical signal bearing channels.

62. Apparatus as described in claim 61 wherein said means to cause stimulated scattering causes stimulated Brillouin scattering and wherein said higher optical frequency differs from said selected region by a Brillouin offset frequency and wherein said relatively narrow control beam is of a width of about the Brillouin gain width.

63. Apparatus as defined in claim 61 comprising control means to select the optical frequency of said pump control beam and to select said spectral region.

64. Apparatus as defined in claim 63 comprising, additionally, means to broaden the spectral width of said control beam.

65. A frequency selective optical amplifier for demultiplexing one optical signal from a plurality of optical signals at differing optical frequencies on a common optical fiber, said optical amplifier comprising tuning means for selecting and amplifying one such optical signal and discriminating against remaining of said optical signals.

66. An optical amplifier as described in claim 65 wherein said optical amplifier further comprises (a) means for generating a control beam, (b) means for combining a portion of said plurality of optical signals, which include a selected signal and other signals, with said control beam onto an optical path, said path being in a material producing optical amplification in response to the control beam and in a relatively narrow spectral region at an optical frequency displaced from, but a function of the optical frequency of said control beam, said optical frequency of said control beam being adjustable by said generating means to produce amplification of said selected optical signal and appreciably less amplification of said other signals.

67. Apparatus as defined in claim 66 wherein said means for generating produces a said control beam varying in time between two frequencies differing by an amount comparably to the gain width in the optical path.

68. Apparatus as described in claim 66 wherien said generating means includes means for producing a said control beam alternating in time between two orthogonal polarization states.

69. Apparatus as described in claim 68 wherein said means for generating comprises means for rectifying the polarization state of said selected optical signal so that its polarization while travelling in said path in substantially constant in time.

70. A process for improving the reception of a selected optical signal by
creating stimulated scattering between said selected signal and a control beam, said process comprising the steps of
using said control beam to adjust the frequency range of the gain curve of said stimulated scattering, to obtain a frequency range which yields a substantial gain throughout at least most of the spectrum of said selected signal but appreciably less gain outside said spectrum.

71. A process as defined in claim 70 comprising the step of maintaining the polarization state of said selected signal and said control beam in relation to each other such that said substantial gain is substantially constant in time.

72. A process as defined in claim 70 comprising the step of utilizing a said frequency range of a spectral width comparable to the gain width of the stimulated scattering and maintaining said frequency range at a higher frequency than that of said selected signal.

73. A laser head as defined in claim 51 wherien said resonant cavities are glass doped with neodymium and form means to provide laser amplification on pumping by an energy source.

74. A laser head comprising a plurality of resonant cavities surrounded by a light conducting region of material of index of refraction intermediate between the index of refraction of the resonant cavities and that of a surrounding common matrix, said surrounding region being suitable to accept pumping light introduced at one face of said region and laterally inject said pumping light continously into said plurality of resonant cavities along their respective lengths.

75. A fiber optic amplifying apparatus as defined to claim 58 together with means to couple laser pump light into said adjacent light conducting region.

76. A fiber optic amplifying apparatus as defined in claim 58 together with laser diode pump means said laser diode not being laterally single mode.

77. A fiber optic amplifying apparatus as defined in claim 58 together with means to couple pump light into said adjacent region at intervals along its length.

78. A monolithic laser head comprising a non-resonant core phase matched with, and laterally coupled to, two resonant cavities, all said cavities within a common matrix and wherein said resonant cavities are formed of materials which are means to produce laser amplification.

79. A laser head as defined in claim 78 wherein the said resonant cavities differ slightly in length and have one resonant frequency in common and wherein other resonant frequencies of one cavity differ from the resonant frequency of the other cavity.

* * * * *

UNITED STATES PATENT AND TRADEMARK OFFICE
CERTIFICATE OF CORRECTION

PATENT NO. : 4,778,238
DATED : 18 October 1988
INVENTOR(S) : John W. Hicks

It is certified that error appears in the above-identified patent and that said Letters Patent is hereby corrected as shown below:

Column 9, Lines 61 & 62 delete "halfway between the 2 of curve (a). Curve (c) shows 3 frequencies";

Column 22, Line 51 "layer" should read --laser--;

Column 22, Line 60 "33" should read --34--;

Column 22, Line 64 "33" should read --34--;

Column 22, Line 67 "52" should read --24--;

Column 23, Line 29 "41" should read --12--;

Signed and Sealed this

Eleventh Day of April, 1989

Attest:

DONALD J. QUIGG

Attesting Officer

Commissioner of Patents and Trademarks